US006872954B2

(12) United States Patent
Ueberall

(10) Patent No.: US 6,872,954 B2
(45) Date of Patent: Mar. 29, 2005

(54) CLEANING APPARATUS

(75) Inventor: Peter Ueberall, Uetersen (DE)

(73) Assignee: Trojan Technologies Inc., London (CA)

( * ) Notice: Subject to any disclaimer, the term of this patent is extended or adjusted under 35 U.S.C. 154(b) by 0 days.

(21) Appl. No.: 10/345,951

(22) Filed: Jan. 17, 2003

(65) Prior Publication Data

US 2004/0140434 A1 Jul. 22, 2004

(51) Int. Cl.[7] .................................................. C02F 1/32
(52) U.S. Cl. .................... 250/431; 250/432 R; 250/436
(58) Field of Search ............................ 250/431, 432 R, 250/436, 504 R; 15/104.04; 165/95

(56) References Cited

U.S. PATENT DOCUMENTS

| | | | | | |
|---|---|---|---|---|---|
| 622,524 | A | * | 4/1899 | McMullen | 15/104.04 |
| 2,620,504 | A | * | 12/1952 | Slater | 15/220.4 |
| 3,061,721 | A | * | 10/1962 | Brenner | 250/431 |
| 3,456,107 | A | * | 7/1969 | Robertson | 250/431 |
| 3,904,363 | A | * | 9/1975 | Free | 250/431 |
| 4,367,410 | A | * | 1/1983 | Wood | 250/431 |
| 4,375,115 | A | * | 3/1983 | Zimmerman | 15/160 |
| 4,750,249 | A | * | 6/1988 | Richardson | 29/81.1 |
| 5,001,801 | A | * | 3/1991 | Jarvis et al. | 15/93.1 |
| 5,005,245 | A | * | 4/1991 | Dooley et al. | 15/104.04 |
| 5,094,557 | A | * | 3/1992 | Nelson et al. | 401/11 |
| 5,528,044 | A | * | 6/1996 | Hutchison | 250/431 |
| 6,570,167 | B1 | * | 5/2003 | Bryer et al. | 250/431 |
| 6,646,269 | B1 | * | 11/2003 | Traubenberg et al. | 250/431 |

FOREIGN PATENT DOCUMENTS

DE 10032645 A1 * 1/2002 ............. B08B/1/00

* cited by examiner

*Primary Examiner*—Nikita Wells
*Assistant Examiner*—Anthony Quash
(74) *Attorney, Agent, or Firm*—Katten Muchin Zavis Rosenman

(57) ABSTRACT

A cleaning apparatus with cleaning rings for cleaning cylindrical bodies, preferably for the quartz cladding tubes in UV disinfection units, especially in UV disinfection sluices for waste water, which in addition to an axially parallel longitudinal movement over the outside surfaces perform an additional angularly limited and alternating rotational movement The object of the invention is a cleaning apparatus with cleaning rings for cleaning cylindrical bodies, preferably for the quartz cladding tubes in UV disinfection units, especially in UV disinfection sluices for waste water, which in addition to an axially parallel longitudinal movement over the outside surfaces perform an additional angularly limited and alternating rotational movement. According to the inventive idea the cleaning rings are moved slowly in an axially parallel way over the quartz cladding tubes, with the same moving additionally in an angularly limited and with suitable speed alternatingly about a rotational axis for reinforcing the cleaning performance and especially for the better penetration of troughs at places that are out of round. This manner of movement of the cleaning rings necessitates a considerably lower amount of mechanical complexity at virtually the same cleaning performance than would be necessary in a full and uninterrupted rotation of the cleaning rings. Compared with the usual rigid wiper rings which are moved back and forth in an axially parallel manner on the quartz cladding tubes without any rotational movement, the cleaning performance with the cleaning rings according to the inventive idea is considerably better.

17 Claims, 3 Drawing Sheets

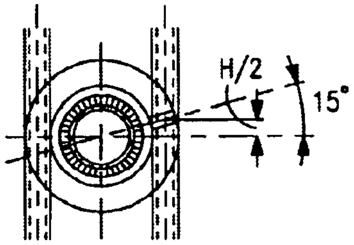
FIG. 4a
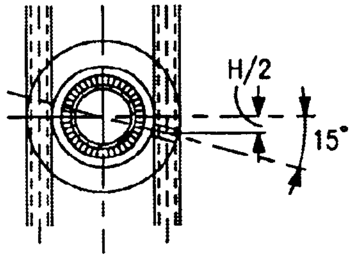
FIG. 4b
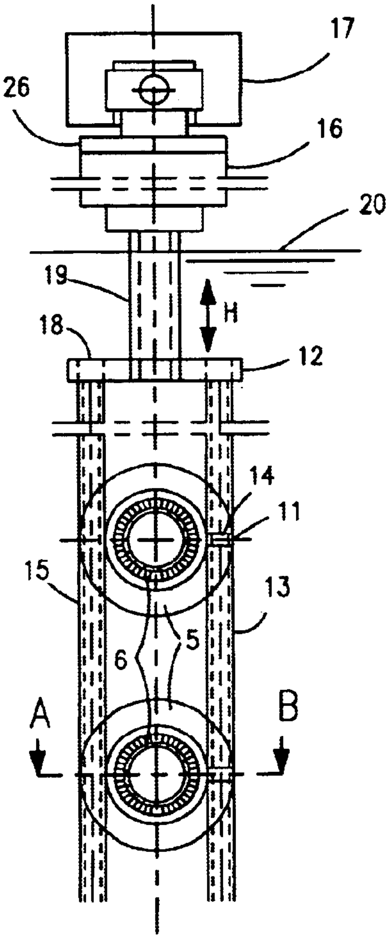
FIG. 4
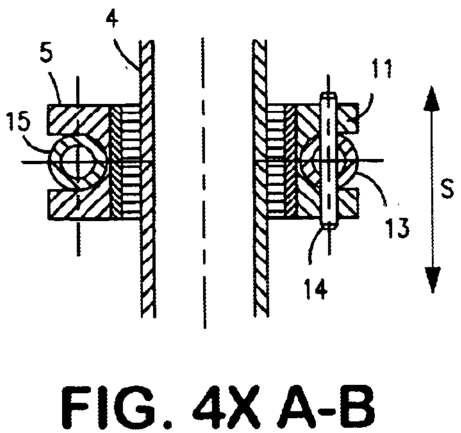
FIG. 4X A-B

CLEANING APPARATUS

BACKGROUND OF THE INVENTION

1. Field of the Invention

The object of the invention is a cleaning apparatus with cleaning rings for cleaning cylindrical bodies, preferably for the quartz cladding tubes in UV disinfection units, especially in UV disinfection sluices for waste water, which in addition to an axially parallel longitudinal movement over the outside surfaces perform an additional angularly limited and alternating rotational movement.

2. Description of the Prior Art

Wiper apparatuses with rigid wiper rings which are mostly made of UV-proof teflon and can be moved back and forth on the quartz cladding tubes in which the UV radiators are installed have long been used in closed cylindrical UV radiation chambers. The quartz glass, of which the cladding tubes for UV radiators are made, is a material that is difficult to process. The quartz cladding tubes are drawn in the doughy state and are often not precisely round and as a result come with relatively high diameter tolerances. For this reason alone, rigid wiper rings cannot be fully effective at all places because troughs in the surface of the cladding tubes pass under the spatula edge of a wiper ring and the wiper rings do not rest in a sufficiently flush way in the case of a lower deviation in the dimension. Such wiper rings also mostly wipe over the mostly slimy initial soiling on the quartz cladding tubes. Round brushes instead of rigid wiper rings are better, but are only useful and effective as long as they rotate about the quartz cladding tubes. This requires a considerable mechanical effort with respect to gearing since the units comprise a large number of UV radiators, with every single one of them being housed in a cladding tube. It is currently more appropriate in closed UV radiation chambers and especially also in UV disinfection sluices for waste water to ensure according to the state of the art that that one can quickly remove and install the quartz cladding tubes without breakage instead of making do with the inadequate rigid wiper rings. Often, the wiper apparatuses are omitted. Within a short service operation every quartz cladding tube can be removed quickly, inspected precisely and cleaned thoroughly outside of the radiation chamber. In the case of open UV radiation sluices, the banks are arranged in superimposed rows of UV radiators in modules which can be withdrawn for cleaning purposes and are immersed in cleaning solutions for example in order to reinsert them again in the radiator bank after rinsing. The statements made above already apply insofar as such radiator banks in UV radiation sluices comprise wiper apparatuses for the quartz cladding tubes. The problem is well-known to all manufacturers and also the operators of UV units and solutions are always considered. Partly they lead to exotic solutions, e.g. to wiper rings with chambers which additionally contain cleaning chemicals which are to be used up over time.

FIG. 1 shows a wiper ring 1 in a can-shaped ring housing 2 which is fastened to a wiper rod assembly 3 with which it can be moved back and forth on the quartz cladding tube 4 in both directions of movement S. Mostly two or more wiper rings are spaced on the quartz cladding tube which overlap one another so as to avoid any empty spaces during the cleaning process on the cladding tube surface and the wiper strokes are shorter. Reference numeral 8 relates to an trough shown excessively large at a place which is out of round on the surface of the cladding tube 4. It is easy to see that even in the case that the trough depth is in the tenth millimeter range one cannot expect a one-hundred percent cleaning effect, apart from the smearing of dirt at virtually round places on the quartz tube.

SUMMARY OF THE INVENTION

It is an object of the present invention to obviate or mitigate at least one of the above-mentioned disadvantages of the prior art Accordingly, in one of its aspects, the present invention provides A cleaning apparatus for cleaning cylindrical bodies, characterized in that it comprises one or several cleaning rings which are reciprocated in an axially parallel way on one or several of the cylindrical bodies to be cleaned and can be rotated in any axially limited manner, i.e. within a certain angular range, alternating about an axis

BRIEF DESCRIPTION OF THE DRAWINGS

Embodiments of the present invention will be described with reference to the accompanying drawings, wherein like reference numerals denote like parts, and in which:

FIGS. 2–5 illustrate various views of preferred embodiments of the present cleaning apparatus.

DETAILED DESCRIPTION OF THE PREFERRED EMBODIMENTS

The relevant aspect of the invention is explained by reference to FIGS. 2 and 3. It concerns in both cases cleaning rings with round brushes 6 on the quartz cladding tube 4. If one departs from the notion that the round brushes need to rotate fully on the cladding tube, i.e. they need to run in a fully round fashion, and if one accepts an angularly limited alternating movement of the brushes on the cladding tube which can be both a revolving movement according to FIG. 2 as well as a tilting movement according to FIG. 3, simple movement mechanisms for the drive of the cleaning ring are obtained. That is the basic idea of the present invention, namely to provide the cleaning rings, in addition to the longitudinal movement on the quartz cladding tubes, with merely an angularly limited, alternating additional rotational movement—in other words, to "rough down" the cladding tubes, i.e. to "brush them off" instead of moving back and forth in a spatula-like way on the dirt. This leads to a considerably improved cleaning output at an only low additional constructional effort as compared with merely reciprocating cleaning wipers, irrespective of the arrangement that they may have.

Figure 1:
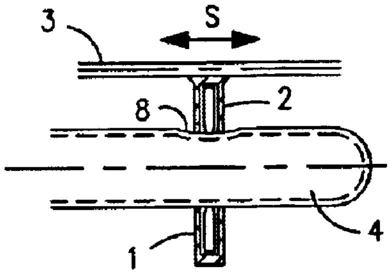
FIG. 1 illustrates a sectional view of a prior art cleaning apparatus.
Figure 2A:
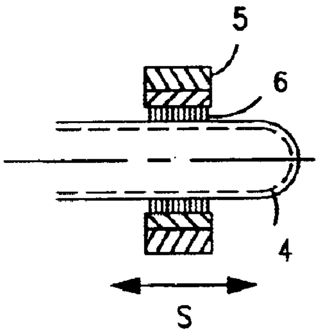
Figure 2B:
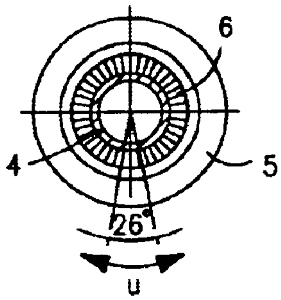

FIG. 2 shows with the cleaning ring 5 and an inserted round brush 6 on the quartz cladding tube 4 the meant angularly limited alternating circumferential movement "u" which is 20° for example. If the round brush alternates relatively quickly on the surface of the cladding tube as compared with the longitudinal movement "S" along the quartz cladding tube, then the cleaning effect will be very good. As experience has shown, since the initial soiling on quartz cladding tubes, especially in the case of wetting of the surfaces with waste water, is low and slimy at first, the starting dirt film will be brushed off completely during each passage of the cleaning ring when such cleaning rings are put into operation right from the start and the known encrustations are thus avoided, which may pose a problem even for brushes. One can therefore expect that the service life of the quartz cladding tubes in operation in the unit, i.e. the service life from the first necessary removal of the cladding tubes for a thorough inspection and cleaning outside of the unit, is thus considerably extended, which in units with many installed UV radiators or modules can lead to considerable cost savings. A service life of the quartz cladding tubes is desirable for the duration of the UV radiator utilization which in the case of a skillful constructional application of the inventive idea is certainly possible.

Figure 3A:
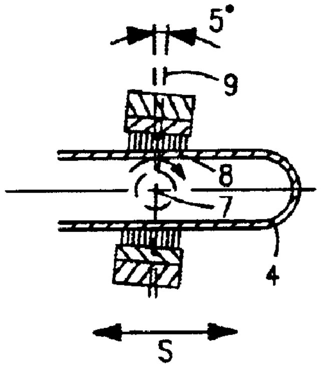
Figure 3B:
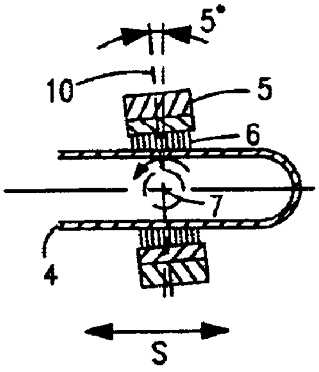

FIG. 3 shows an angularly limited alternating rotation of the cleaning ring 5 with the ring brush 6 about another rotational axis, namely one with reference numeral 7, which stands perpendicular to the longitudinal axis of the quartz cladding tube. It does not represent itself on the surface of the quartz cladding tube as a circumferential movement as shown in FIG. 2, but it appears in the top view according to FIG. 3 as a tilting movement which to all intents and purposes produces a cleaning effect on the surface of the tube and brushes off the same in another typical manner. For example, the end position 9 is 5° to the right from the central position in FIG. 3*a* and the opposite position 10 to the left in FIG. 3*b* is also 5° from the central position. The paths of the bristles on the surface are not similar everywhere, but instead depend on where they are located on the surface of the quartz cladding tube. In FIG. 3*a* one can also see a depth action in troughs. The scouring movement on the surface of the tube might not be as convincing as in the method according to FIG. 2. Constructional simplifications are obtained here, however, as the embodiment 2 will show.

The initial soiling requires not so much fixed mechanical scraping for removal as instead an alternating movement of the adjacent water that wets the same. The alternatingly moved bristles of the brushes which practically brush back and forth on the surfaces and make the water particles move rapidly too, also transmit the movement to the as yet non-encrusted dirt, which is moved and conveyed into the ambient water in such a way that it entrains the same. During the continual reciprocation on the quartz cladding tubes, the brushes will meet nearly clean places during the return run. The relevant aspect is merely the removal of a slight amount of initial soiling which need to be conveyed by the brushes, lamellae or packings in accordance with the inventive idea by rapid whirling up into the ambient water. It is irrelevant in this respect how the brushes move in an alternating manner on the surface.

Embodiment 1 According to FIG. 4.

The principle according to FIG. 2 is applied with a cleaning ring with an angularly limited alternating circular movement. In FIG. 4, reference numeral 4 relates to the parallel quartz cladding tubes of a UV disinfection sluice with the water level 20, which tubes are situated at the top and are to be cleaned. Reference numeral 5 relates to the cleaning rings with the radial driver grooves 11 and the inner brushes 6. The linear longitudinal movement of the cleaning rings 5 along the quartz cladding tubes 4 in the direction of movement "S" is to be performed with a guide fork 12 with the two driver rods 13 and 15 which are fastened to a yoke which is connected with the connection element 19 and the short-stroke generator 16 which is fastened to the driver plate 26 of a linear drive 17 which is disposed above the superimposed quartz cladding tubes. The short-stroke generator can be understood as being a unit with an electromagnet with a return spring. The starting point of the stroke and the length of the stroke are to be adjustable. The frequency of the strokes is determined via an electric control unit. When actuating the linear drive, the guide fork moves the cleaning rings longitudinally back and forth on the quartz cladding tubes. The right driver rod 13 of the drive fork 12 is provided with driver pins 14 which engage in the radial grooves 11 of the cleaning rings. A driver pin 14 is provided for each cleaning ring. The left driver rod assembly 15 is not provided with any driver pins. When the stroke generator moves the guide fork alternatingly up and down, the cleaning rings are moved in an alternating and angularly limited manner and in the circumferential direction on the surfaces of the tubes 4 by the driver rod assembly 13. The left guide rod 15 slides up and down only in the ring groove of the cleaning ring. It is important, however, for an unjammed longitudinal guidance of the cleaning rings on the quartz tubes. As a result of the loosening alternating movement on the quartz cladding tubes, the cleaning rings will follow the guide fork with ease, which is very important in the case of eight or ten superimposed quartz tubes for example, so that the guide fork will not get stuck at the bottom and be forced to continue linearly at the top. A cut-off apparatus for the linear drive for the case of a failure of the additional alternating movement, i.e. in the case of a failure of the magnetic stroke generator, should be provided for security reasons. FIG. 4*a* shows in an exemplary manner the upper limit position of the guide fork with half the stroke H/2 from the middle line which corresponds to 15°. FIG. 4*b* beneath shows the lower limit position with a deflection of also 15°, relating to the middle line. The line of intersection A-B is shown on an enlarged scale in the lower left-hand corner.

Figure 5A:
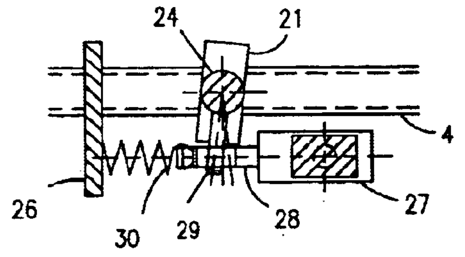
Figure 5A:
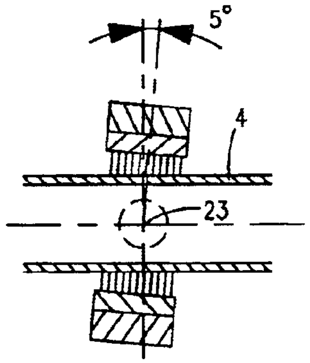
Figure 5:
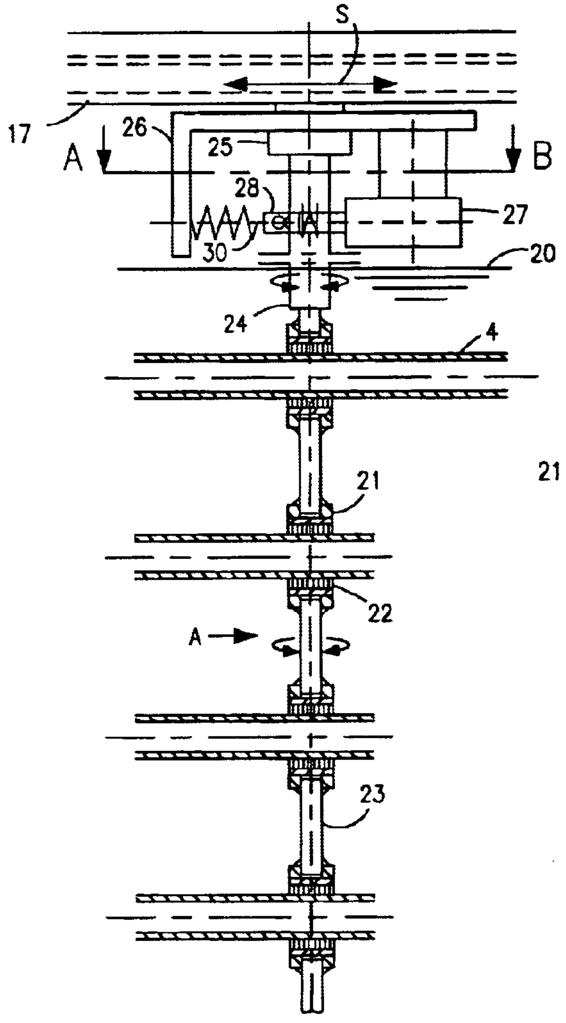

Embodiment 2 According to FIG. 5

Figure 5B:
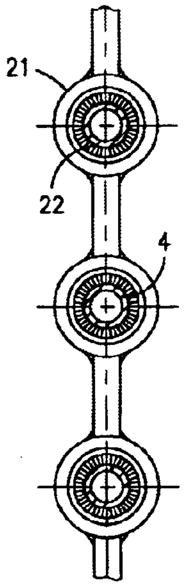
Figure 5B:
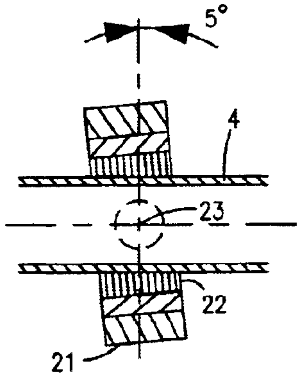

The principle according to FIG. 3 is applied with a cleaning ring with an angularly limited alternating tilting movement about an axis 23 perpendicular to the axis of the quartz cladding tube 4 to be cleaned. FIGS. 5*a* and 5*b* show the brush in the respective end position tilted to the right and left, which is 5° in this case relating to the middle line. In FIG. 5, reference numeral 4 relates to the quartz cladding tubes in a UV disinfection sluice with the water level 20, which quartz cladding tubes are situated in the configuration at the top and are to be cleaned. Reference numeral 21 relates to the cleaning rings with the inner round brushes 22 and the shaft elements 23 for connection among and over each other. They are each inserted into the cleaning rings and fixedly welded to the same. The cleaning rings are precisely aligned above one another and are situated flatly in a plane, as is shown in view "A". The thus configured unit of cleaning rings is fastened to an extension element 24 in a pivot bearing 25 which is fastened to a driver plate 26 of a linear drive 17 which performs the longitudinal movement "S" along the quartz cladding tubes. A unilaterally acting lifting magnet 27 with a slotted tappet 28 and a fulcrum 29 in combination with a return spring 30 are used as the drive for the alternating tilting movement of the cleaning rings 21 in the present second embodiment, with all elements being fastened to the driver plate 26 of the linear drive 17. Irrespective of the linear movement of the cleaning rings 21 over the quartz cladding tubes 4, this magnetic drive is used to tilt the cleaning rings with an adjustable frequency between 5 and 10 per second for example alternatingly about the axis 23. Although the paths of the individual bristles of the ring brushes 22 on the surface of the quartz cladding tubes 4 will differ according to position, there will also be a stirring up of the dirt film in the brush zone in this case too as long as a serious encrustation has not yet occurred. Components such as linear drives, lifting magnets, etc. are commercially available. If it is intended to clean a larger number of quartz cladding tubes with the present embodiment, e.g. eight tubes disposed above one another, then it is necessary to ensure that any jamming, and especially the plucking of the lower rings, is prevented. This will undoubtedly lead to malfunctions as long as the linear drive continues. It can be said in this respect that especially a rapid alternating pilgrim step movement of the cleaning rings will prevent any jamming or plucking on the quartz cladding tubes because only low motional friction must be expected.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. Cleaning apparatus for a cylindrical radiation source, comprising:

at least one cleaning ring configured to be disposed about and clean an outer cylindrical surface of the radiation source;

first structure coupled to said at least one cleaning ring and configured to cause said at least one cleaning ring to move in an axial direction along the outer cylindrical surface of the radiation source; and second structure coupled to said at least one cleaning ring and configured to cause said at least one cleaning ring to move in a circumferential direction about the outer cylindrical surface of the radiation source.

2. The cleaning apparatus defined in claim 1, wherein said radiation source comprises a radiation lamp disposed in a protective sleeve, said at least one cleaning ring being in contact with said protective sleeve.

3. The cleaning apparatus defined in claim 2, wherein the radiation lamp comprises a UV lamp.

4. The cleaning apparatus defined in claim 2, wherein the protective sleeve comprises a quartz sleeve.

5. The cleaning apparatus defined in claim 1, wherein said at least one cleaning ring comprises a brush for contact with the radiation source.

6. The cleaning apparatus defined in claim 1, comprising a plurality of cleaning rings.

7. The cleaning apparatus defined in claim 6, wherein the plurality of cleaning rings is configured such that a single cleaning ring is in contact with a single radiation source.

8. The cleaning apparatus defined in claim 6, wherein the second structure is coupled to each cleaning ring in the plurality of cleaning rings.

9. The cleaning apparatus defined in claim 1, further comprising restriction means to limit movement of said at least one cleaning ring in the circumferential direction.

10. The cleaning apparatus defined in claim 1, wherein the first structure is coupled to a first drive element and the second structure is coupled to a second drive element.

11. The cleaning apparatus defined in claim 10, wherein the first drive element is configured to cause movement of the first structure in a first direction and the second drive element is configured to cause movement of the second structure in a second direction, the first direction being different that the second direction.

12. The cleaning apparatus defined in claim 11, wherein the first direction is substantially orthogonal to the second direction.

13. The cleaning apparatus defined in claim wherein the second structure comprises a rod member.

14. The cleaning apparatus defined in claim 13, wherein said at least one cleaning ring comprises a notch for receiving the rod member.

15. The cleaning apparatus defined in claim wherein the rod member interconnects a plurality of cleaning rings.

16. A radiation source module comprising at least one radiation source and the cleaning apparatus defined in claim 1.

17. The radiation source module defined in claim 16, comprising a plurality of radiation sources.

* * * * *